Feb. 8, 1966　　　R. H. C. HARRISON ETAL　　　3,233,510
SYNCHRONIZING MEANS FOR SLIDE PROJECTOR AND SOUND RECORDER
Filed Sept. 19, 1962　　　　　　　　　　　　　　3 Sheets-Sheet 1

ROBERT H.C. HARRISON
ALWIN HARRY BAMBER
　　　　　　INVENTORS

BY

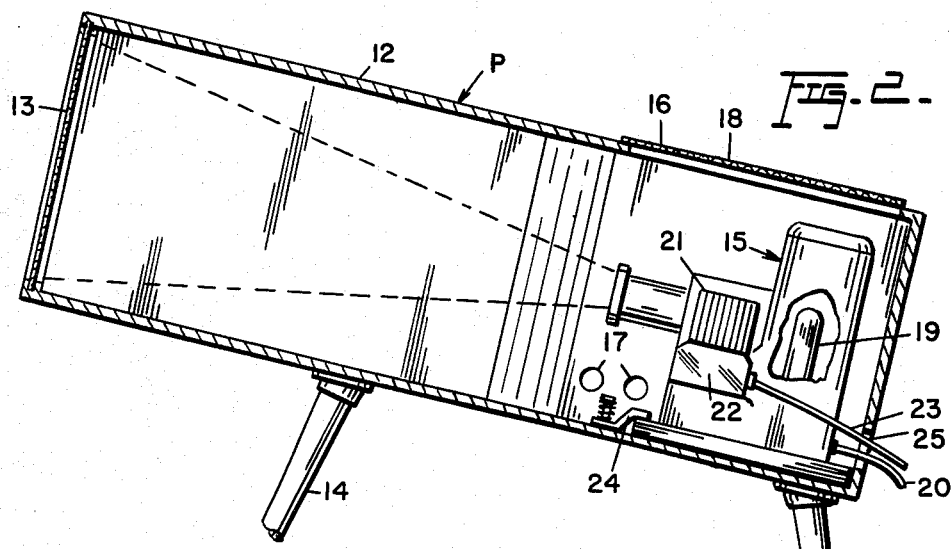
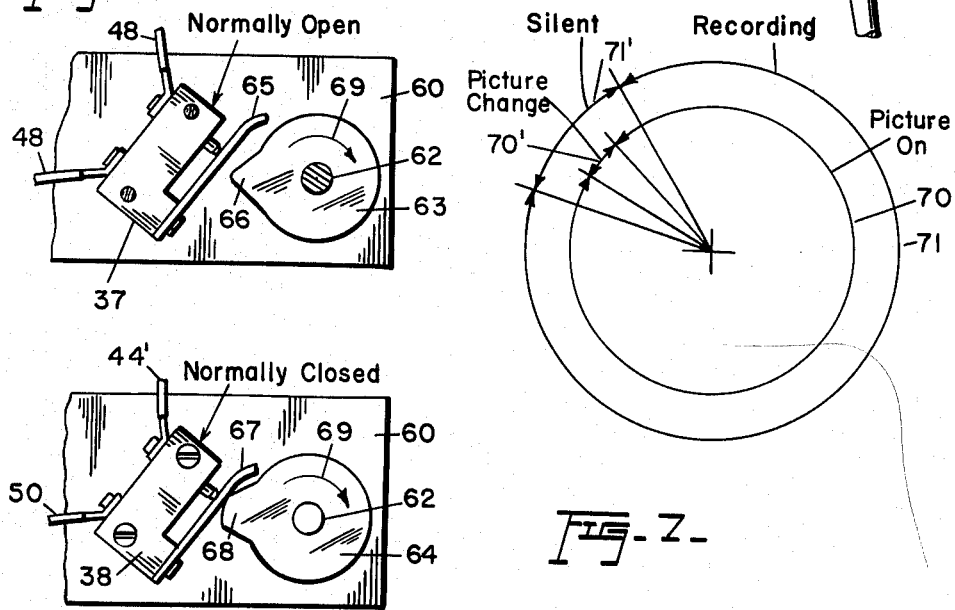
ROBERT H.C. HARRISON
ALWIN HARRY BAMBER
INVENTORS

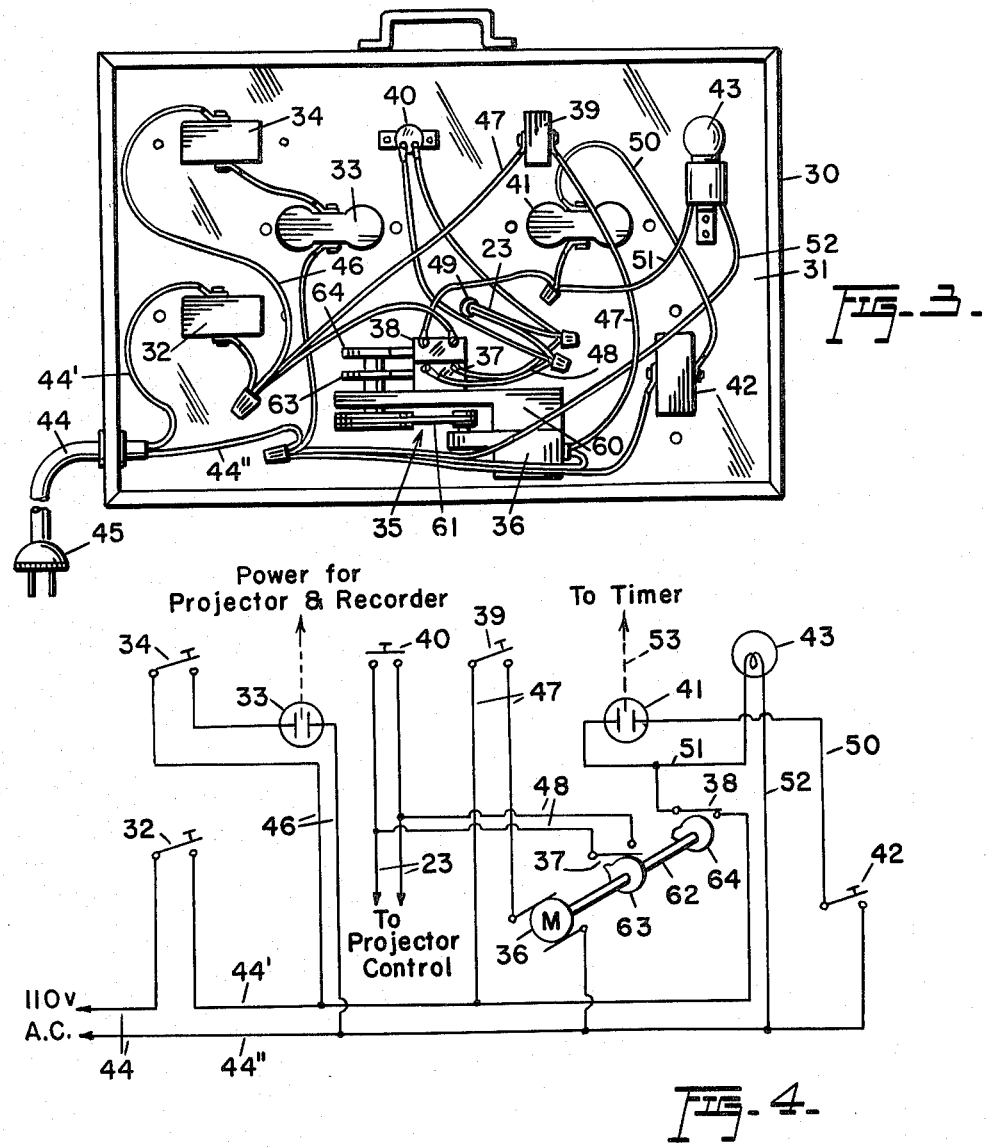

United States Patent Office 3,233,510
Patented Feb. 8, 1966

3,233,510
SYNCHRONIZING MEANS FOR SLIDE PROJECTOR AND SOUND RECORDER
Robert H. C. Harrison, 444, 330 9th Ave., SW., and Alwin Harry Bamber, 2037 Mountainview Crescent, both of Calgary, Alberta, Canada
Filed Sept. 19, 1962, Ser. No. 224,767
5 Claims. (Cl. 88—28)

This invention relates to new and useful improvements in the art of picture projection with synchronized sound, and in particular the invention concerns itself with a sound accompanied picture projecting apparatus which embodies novel means for effecting and controlling the synchronization of sound and picture, both at the time of recording of the sound and at the time of sound playback with picture projection. As such, the invention is primarily intended for use with a conventional tape recorder and a conventional slide projector having a slide magazine equipped with a remote control whereby pictures on a plurality of slides may be individually and successively exposed to view. The principal object of the invention is to provide a simple and a highly efficient control unit whereby sound may be easily recorded on the tape of the recorder in synchronization with the picture sequence and whereby the sound may be subsequently reproduced in proper synchronization when the slides are projected.

An important feature of the invention resides in the provision of a sound and picture synchronization control unit as above outlined, which may be used in a highly versatile manner to provide such facilities as picture scanning without sound recordation, variation in duration of picture projection, and the like.

Another important feature of the invention resides in the provision of a projection apparatus embodying a conventional slide projector and a rear projection screen, on which projected pictures are clearly visible even in broad daylight.

Other advantages of the invention reside in its simplicity, efficient operation without the requirement of special skills, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 2 is a fragmentary, vertical longitudinal sectional view of the projection apparatus per se;

FIGURE 3 is a rear elevational view of the control unit with the back cover thereof removed;

FIGURE 4 is a wiring diagram of the components of the control unit;

FIGURE 5 is an enlarged, fragmentary view of one cam-actuated switch of a timer mechanism in the control unit;

FIGURE 6 is an enlarged, fragmentary view of another cam-actuated switch of the timer mechanism; and FIGURE 7 is a diagrammatic illustration showing the sequence of operation of the switches of FIGURES 5 and 6.

Figure 1:
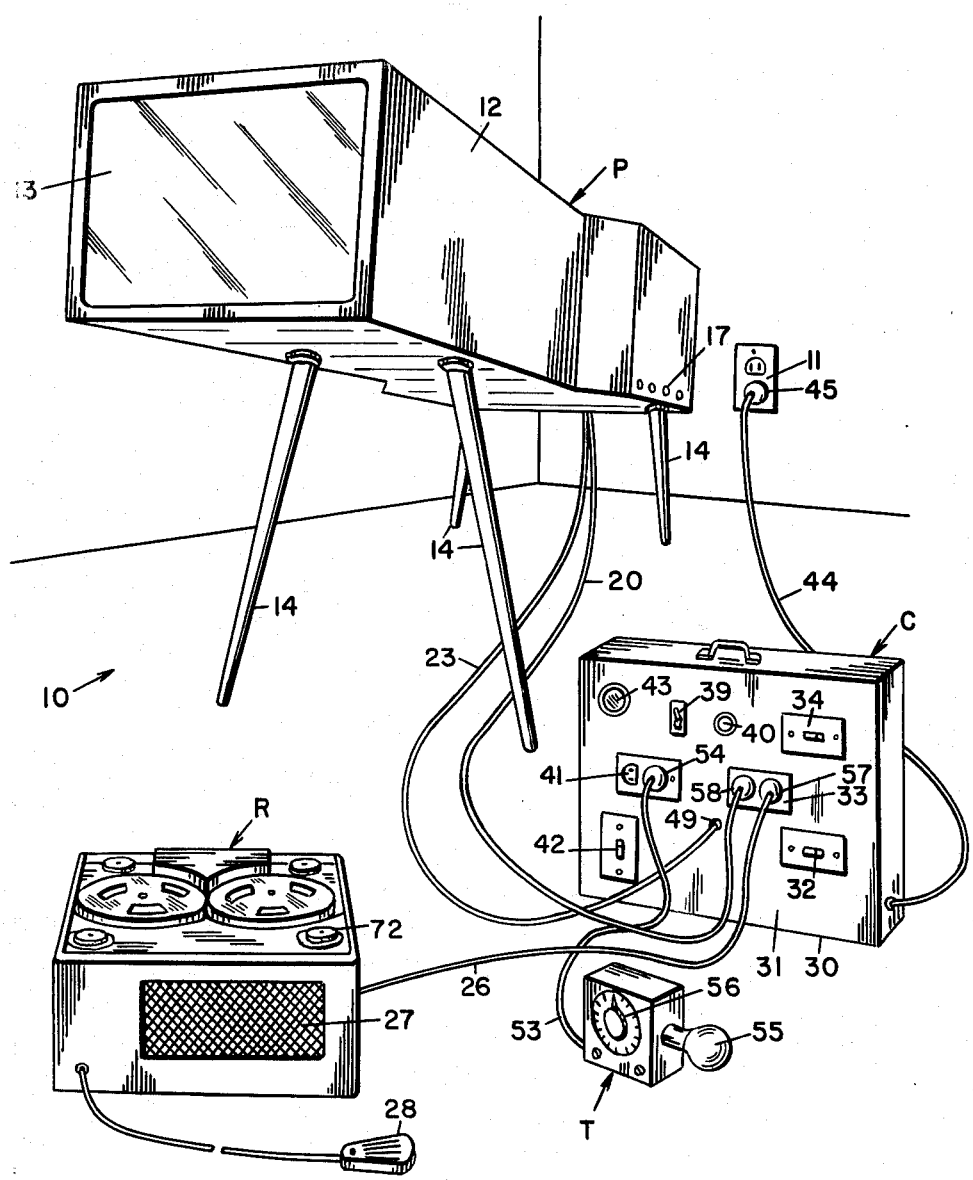
FIGURE 1 is a perspective view of the picture projector, sound recording and control apparatus in accordance with the invention.

Referring now to the accompanying drawings in detail, the synchronized sound and picture projecting apparatus in accordance with the invention is designated generally by the reference numeral 10 in FIGURE 1, and embodies a projecting device P, a conventional tape recorder R, and a control unit C including a supplemental timer T. The entire apparatus derives its power from a suitable source of electric current, as for example, from a wall outlet 11.

As shown in FIGURES 1 and 2, the projecting device P comprises an elongated housing 12 which is provided at its front end with a rear projection screen in the form of a translucent panel 13, the housing 12 being supported in an appropriate position by a plurality of legs 14. The rear end portion of the housing 12 removably accommodates a conventional slide projector 15 which may be inserted in and removed from the housing through an openable door or closure 16 which the housing is equipped. The rear end portion of the housing is provided adjacent the bottom thereof with air inlet openings 17 while the door 16 is equipped with a screen 18, whereby to facilitate ventilation and dissipation of heat from the projection 15, as will be clearly apparent.

As already stated, the projector 15 is of a conventional type, so that a detailed description thereof is unnecessary. However, it may be noted that the projector includes the usual projection lamp 19 which derives its source of current through a conductor 20, and it also includes a slide magazine 21 having an actuator 22 operated by a remote control cable 23, whereby pictures on the slides in the magazine 21 may be individually and successively projected on the screen 13.

The projector 15 is suitably located in the housing 12 so as to be in proper optical alignment with the screen 13, and suitable means, such as for example, one or more spring-pressed clamps 24 are employed for removably retaining the projector in place. The cables 20, 23 extend from the projector outwardly through an opening 25 at the back of the housing, as will be clearly understood.

Also as already noted, the tape recorder R is of a conventional type so that a detailed description thereof is unnecessary, apart from mentioning that it receives its supply of current through a cable 26 and that it is equipped with the usual speaker 27 and a microphone 28.

Proceeding now to describe the control unit C, the same embodies a suitable casing 30 which has a front wall 31 and a removable back wall (not shown) so that access may be had to several electrical components which are disposed within the casing and carried by the front wall 31. These components comprise a master switch 32; a projector and recorder outlet 33; a switch 34 to control the outlet 33; an interval timer mechanism 35 which is driven by an electric motor 36 and includes a pair of microswitches 37, 38; a switch 39 for the motor 36; a normally open, momentary contact or push button switch 40 for by-passing the switch 37 of the timer mechanism 35; an outlet 41 in circuit with the switch 38 of the timer mechanism; a switch 42 in circuit with the outlet 41; and a timing signal lamp 43. These various components are electrically connected together as will be now explained.

A feed cable 44, equipped with an attachment plug 45 for connection to the power supply 11, extends into the casing 30 and one conductor 44' of the feed cable has the master switch 32 in series therewith. The outlet 33 and its control switch 34 are connected together in series by the conductors 46, which are connected in parallel to the feed conductors 44' and 44". The motor 36 of the timer mechanism 35 is connected in series with the switch 39 by conductors 47 which are joined in parallel to the feed conductors 44', 44". The micro-switch 37 of the timer mechanism 35 is connected by a pair of conductors 48 in parallel with the push button switch 40 to the conductors of the cable 23 which enters the casing 30 through an aperture 49 in the front wall 31. One contact of the timer mechanism micro-switch 38 is connected to the feed conductor 44', while its other contact is connected by a conductor 50 in series with the outlet 41 and switch 42 to the feed conductor 44″. The signal lamp 43 is connected by a conductor 51 to the conductor 50 at a point between the switch 38 and the outlet 41, and by a conductor 52 to the feed conductor 44″, so that in effect, the lamp 43 is in series with the switch 38 and in parallel with the outlet 41.

The auxiliary or supplemental timer T is also of a conventional type, embodying a motor actuated switch (not shown). The motor of the switch derives its current through a cable 53 equipped with a plug 54 for electrical contact with the aforementioned outlet 41. The motor actuated switch of the supplemental timer energizes and de-energizes a signal lamp 55, the duration of energization of the lamp 55 being variable by manually adjustable means 56.

The cable or conductor 20 extending from the lamp 19 of the projector 15 is provided with a plug 57 for reception in the outlet 33, while the cable 26 extending from the tape recorder R is similarly provided with a plug 58 for reception in the same outlet 33, as shown.

The aforementioned timer mechanism 35 in the casing 30 includes the motor 36 which is suitably supported by a mounting plate 60 in the casing. The motor 36 is operatively connected by an endless belt drive 61 to a shaft 62 which has a pair of cams 63, 64 secured thereto. (See FIGS. 5 and 6.) The micro-switches 37, 38 are mounted in juxtaposed relation on the plate 60, the switch 37 having an actuator 65 which is engageable by the lobe 66 of the cam 63, while the switch 38 has an actuator 67 engageable by the lobe 68 of the cam 64. The micro-switch 37 is normally open and is closed only when the cam lobe 66 comes in engagement with the switch actuator 65. On the other hand, the micro-switch 38 is normally closed and is opened only when the cam lobe 68 comes in engagement with the switch actuator 67. It will be noted that the arrangement of the cams 63, 64 and their position on the shaft 62 is such that, when the shaft is rotated in the direction of the arrow 69, the normally closed switch 38 is first opened and while it is open, the normally open switch 37 is closed and then re-opened, whereupon the open switch 38 is closed. This is shown diagrammatically in FIGURE 7 wherein the circle 70 represents a complete rotation of the cam 63 and the circle 71 represents a complete rotation of the cam 64. The segment 70′ of the circle 70 represents the portion of rotation of the cam 63 during which the switch 37 is closed, while the segment 71′ of the circle 71 represents the portion of rotation of the cam 64 during which the switch 38 is open. It will be noted that the segment 71′ is longer than the segment 70′ and that the segment 70′ is overlapped at both ends by the segment 71′, in other words, the segment 70′ is contained wholly within and spaced from the angular limits of the segment 71′.

In operation, the various components of the apparatus are connected together as already explained and the attachment plug 45 of the feed cable 44 is applied to the current source 11. Upon closing of the switches 32 and 34, current will be available at the outlet 33 for energizing the projector 15 through the cable 20 and the tape recorder R through the cable 26, it being understood that the recorder is equipped with a built-in on and off switch 72 whereby it may be started and stopped as desired. It will be also understood that the cable 23 which energizes the projector lamp 19 also furnishes power for the slide magazine 21, the operation of the latter being remotely controlled through the conductors 23 so that when circuit through these conductors is established, as by closing of either the switch 37 or the switch 40, the mechanism of the slide magazine is actuated to bring successive slides or pictures into view.

With the built-in recorder switch 72 turned off, the push button switch 40 may be depressed in a repeated fashion so that the various slides in the magazine 21 may be quickly scanned, whereupon the slides are returned to their initial starting position in the usual manner. A tape recording may then be cut on the recorder R by first closing the switch 39 to energize the timer motor 36, whereby to rotate the shaft 62 to a position where the micro-switch 38 has just closed and the signal lamp 43 has been lighted. The recorder switch 72 is then closed and an audible signal is recorded on the tape, whereupon the recorder is played back to the point of the audible signal. By pressing the button switch 40, the first slide picture is then brought into view on the screen 13, and by again turning on the switch 39 to start the motor 36, a sound recording is made on the tape of the recorder R through the microphone 28, during the time that the signal lamp 43 remains lighted by the closed switch 38. The duration of this recording time may be, for example, 90 seconds, as represented in FIGURE 7 by the circle 71 minus the "silent" segment 71′ which may last, for example, for 5 seconds. During the recording time the same picture remains projected on the screen 13, and when the shaft 62 rotates to a position where the switch 38 is opened, the signal lamp 43 will be de-energized to indicate that the recording procedure is to be stopped.

During the "silent" segment 71′ of the recording cycle, the continued rotation of the shaft 62 will cause the cam 63 to close the micro-switch 37, thus providing an impulse, perhaps of a two or three second duration, to actuate the mechanism of the slide magazine 21 and bring the next picture into view, this impulse taking place during the "picture change" segment 70′ (in FIG. 7) which is contained within the "silent" recording segment 71′, so that by the time the switch 38 is again closed to energize the recording signal lamp 43, the next picture is in view on the screen for a sound recording to be made in connection therewith. This procedure, of course, may be repeated until a sound recording has been made for all the slides in the magazine, and if at any time during the recording procedure it is desirable or necessary to interrupt the same, this may be accomplished by simply turning off the master switch 32. Thus, when the procedure is to be resumed, the switch 32 may be turned on and the procedure continued without loss of synchronism, inasmuch as opening of the switch 32 de-energizes the entire apparatus.

After the tape recording has been made, the recorder tape is wound back to the audible starting signal, the shaft 62 is positioned by actuation of the switch 39 to a point where the signal lamp 43 has just been energized, and the first slide picture is projected on the screen by pressing the switch 40. The switch 39 is then turned on to energize the motor 36 as the switch 34 is turned on to energize both the projector and the tape recorder, so that the sound recording will be reproduced in proper synchronization with the pictures which are successively projected on the screen.

The external timer T may be employed in conjunction with the control unit C whenever it is desired to set the recording time at a shorter duration than is provided by the cycling of the switch 38. The timer T is energized only when the switch 38 is closed (as is the signal lamp 43), but the manually adjustable means 56 of the timer T may be set for a shorter period to energize the timer lamp 55 accordingly, so that the lamp 55 may be extinguished even if the lamp 43 remains lighted. Thus, when the external timer T is used, the lamp 55 rather than the lamp 43 is observed to determine the moment of expiration of the available recording time.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the appended claims.

What is claimed as new is:

1. The combination of a slide projector including a remotely controllable slide magazine whereby a plurality of slide pictures may be projected in succession, a sound recording device, and a control unit whereby operation of said sound recording device may be synchronized with projection of successive pictures by said slide projector, said control unit including switch means for simultaneously energizing and de-energizing said projector and said sound recording device, and a timer mechanism including a first cycling switch means in circuit with said slide magazine for intermittently actuating the same, a timing signal lamp, and a second cycling switch means in circuit with said lamp for intermittently energizing and de-energizing the same in predetermined synchronization with the intermittent actuation of the slide magazine by said first cycling switch means.

2. The combination as defined in claim 1 together with a momentary contact switch connected in parallel with said first cycling switch means to said slide magazine for actuating the latter independently of the first cycling switch means.

3. The combination of a slide projector including an electrically actuated slide magazine for successively placing a set of slide pictures in a viewing position by closing of an electric circuit through a pair of remote control conductors, a sound recording device, and a control unit whereby operation of said sound recording device may be synchronized with projection of successive pictures by said slide projector, said control unit comprising switch means for simultaneously energizing and de-energizing said projector and said sound recording device, and a timer mechanism including a first cycling switch means connected to said pair of remote control conductors for intermittently closing and opening the circuit therethrough, a timing signal lamp, and a second cycling switch means in circuit with said lamp for intermittently energizing and de-energizing the same in predetermined synchronization with the opening and closing of the first cycling switch means.

4. The combination is defined in claim 3 wherein said timer mechanism also includes a drive motor, first and second cams driven simultaneously by said motor and actuating the respective first and second cycling switch means, and switch means for controlling the operation of said motor.

5. The combination as defined in claim 3 together with a momentary contact switch connected in parallel with said first cycling switch means to said pair of remote control conductors.

References Cited by the Examiner
UNITED STATES PATENTS

| | | | |
|---|---|---|---|
| 1,164,937 | 12/1915 | Gillam | 88—24 |
| 1,460,590 | 7/1923 | Kucharski | 88—24 |
| 2,699,089 | 1/1955 | Jakobs et al. | 88—28 |
| 2,811,588 | 10/1957 | Julie | 179—100.1 |

NORTON ANSHER, *Primary Examiner.*

WILLIAM MISIEK, *Examiner.*